United States Patent
Herman et al.

(10) Patent No.: US 9,450,682 B2
(45) Date of Patent: Sep. 20, 2016

(54) METHOD AND SYSTEM USING VIBRATION SIGNATURES FOR PAIRING MASTER AND SLAVE COMPUTING DEVICES

(71) Applicant: International Business Machines Corporation, Armonk, NY (US)

(72) Inventors: Zachary S. Herman, South Weber, UT (US); Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 14/047,335

(22) Filed: Oct. 7, 2013

(65) Prior Publication Data

US 2015/0098308 A1 Apr. 9, 2015

(51) Int. Cl.
*G10K 11/00* (2006.01)
*H04B 11/00* (2006.01)
(Continued)

(52) U.S. Cl.
CPC ............. *H04B 11/00* (2013.01); *G08C 17/02* (2013.01); *G08C 23/02* (2013.01); *G08C 2201/20* (2013.01); *G08C 2201/60* (2013.01)

(58) Field of Classification Search
CPC .. G08C 17/02; G08C 23/02; G08C 2201/20; G08C 2201/60; H04B 11/00; H04B 14/00; H03J 9/04; G05B 2219/1215; G05B 2219/2228; G05B 2219/2231; G05B 2219/2237; H04L 67/1051; H04L 63/0869; H04L 9/0838; H04L 9/08; H04L 2209/805; G06F 21/30; H04W 12/06
USPC ......... 340/500, 501, 531, 540, 669, 1.1, 4.3, 340/5.1, 13.1, 13.2, 13.37, 999; 367/191, 367/197; 700/1, 2, 3, 4; 709/208–211; 710/110; 726/2
See application file for complete search history.

(56) References Cited

U.S. PATENT DOCUMENTS 5,005,142 A    4/1991    Lipchak et al.
5,530,963 A    6/1996    Moore et al.
(Continued)

FOREIGN PATENT DOCUMENTS

DE    3514950 A1    12/1985
DE    3643834 A1    6/1988
(Continued)

OTHER PUBLICATIONS

Salgarelli et al., "Efficient Authentication and Key Distribution in Wireless IP Networks", IEEE Wireless Communications, Dec. 2003, © 2003 IEEE.
(Continued)

*Primary Examiner* — Brian Wilson
(74) *Attorney, Agent, or Firm* — Edward P. Li

(57) ABSTRACT

A method and a system of using vibration signatures for pairing two devices. The method and the system include an apparatus that has a master side and a slave side. The slave side has at least one frictional structure. A first device is inserted into the master side. When a second device is inserted through the slave side, a pattern of vibration is generated. Vibration detecting devices on the first and second devices detect the pattern of vibration. A program of the first device validates a master vibration signature and configures the first device as a master device. A program of the second device validates a slave vibration signature and configures the second device as a slave device. The master device and the slave device are automatically paired.

18 Claims, 5 Drawing Sheets

(51) Int. Cl.
*G08C 23/02* (2006.01)
*G08C 17/02* (2006.01)

(56) References Cited

U.S. PATENT DOCUMENTS

| | | | |
|---|---|---|---|
| 5,539,824 | A | 7/1996 | Bjorklund et al. |
| 6,069,943 | A | 5/2000 | David et al. |
| 6,907,227 | B2 | 6/2005 | Fujioka |
| 7,502,933 | B2 | 3/2009 | Jakobsson et al. |
| 7,565,529 | B2 | 7/2009 | Beck et al. |
| 7,836,308 | B2 | 11/2010 | Gantman et al. |
| 7,966,497 | B2 | 6/2011 | Gantman et al. |
| 8,289,936 | B2 | 10/2012 | Wang et al. |
| 8,296,558 | B1 | 10/2012 | Chowdhury |
| 2001/0048744 | A1 | 12/2001 | Kimura |
| 2002/0095580 | A1 | 7/2002 | Candelore |
| 2002/0131574 | A1 | 9/2002 | Alleman |
| 2004/0001553 | A1 | 1/2004 | Steentra et al. |
| 2005/0010777 | A1 | 1/2005 | Gantman et al. |
| 2005/0038881 | A1 | 2/2005 | Ben-Itzhak |
| 2006/0100927 | A1 | 5/2006 | Zormati |
| 2006/0155399 | A1 | 7/2006 | Ward |
| 2007/0123165 | A1 | 5/2007 | Sheynman et al. |
| 2008/0136678 | A1 | 6/2008 | Harrington |
| 2009/0169018 | A1* | 7/2009 | Deisher ............... H04L 63/0869 380/278 |
| 2009/0215397 | A1 | 8/2009 | Thorn et al. |
| 2010/0082983 | A1* | 4/2010 | Shah .................... H04L 63/061 713/169 |
| 2010/0106222 | A1 | 4/2010 | Sychou et al. |
| 2010/0163616 | A1 | 7/2010 | Phillips et al. |
| 2010/0167646 | A1 | 7/2010 | Alameh et al. |
| 2010/0293378 | A1 | 11/2010 | Xiao et al. |
| 2011/0086712 | A1 | 4/2011 | Cargill |
| 2011/0093227 | A1 | 4/2011 | Huang et al. |
| 2011/0093712 | A1* | 4/2011 | Jin ....................... H04L 9/0839 713/171 |
| 2012/0069792 | A1 | 3/2012 | Kishida |
| 2012/0135687 | A1 | 5/2012 | Thorn et al. |
| 2012/0171963 | A1 | 7/2012 | Tsfaty |
| 2012/0174150 | A1 | 7/2012 | Reddy et al. |
| 2012/0197556 | A1 | 8/2012 | Manoosingh et al. |
| 2012/0218979 | A1 | 8/2012 | Yeh et al. |
| 2012/0310554 | A1 | 12/2012 | Lin |
| 2012/0330734 | A1 | 12/2012 | Brown et al. |
| 2013/0067081 | A1 | 3/2013 | Liu et al. |
| 2013/0067544 | A1 | 3/2013 | Kwark et al. |
| 2013/0069772 | A1 | 3/2013 | Najafi et al. |
| 2013/0241468 | A1 | 9/2013 | Moshfeghi |
| 2014/0029858 | A1 | 1/2014 | Tung |
| 2014/0059347 | A1 | 2/2014 | Dougherty et al. |
| 2014/0106709 | A1 | 4/2014 | Palamara et al. |
| 2014/0369169 | A1 | 12/2014 | Iida et al. |
| 2015/0059480 | A1 | 3/2015 | Dockrey et al. |
| 2015/0065199 | A1 | 3/2015 | Shah et al. |
| 2015/0089593 | A1 | 3/2015 | Herman et al. |
| 2015/0098308 | A1 | 4/2015 | Herman et al. |

FOREIGN PATENT DOCUMENTS

| | | |
|---|---|---|
| EP | 0424715 A2 | 5/1991 |
| FR | 2655797 A1 | 8/1989 |
| JP | 2003256170 A | 9/2003 |
| WO | 0064125 A1 | 10/2000 |

OTHER PUBLICATIONS

"Easy wifi autoconfiguration with barcodes"; I Still Know What You Learned Last Summer; printed Jul. 13, 2013; <http://psung.blogspot.com/2010/12/easy-wifi-autoconfiguration-with.html[Jul. 17, 2013 11:07:13 AM]>.

McMahan, et al., "Displaying Realistic Contact Accelerations Via a Dedicated Vibration Actuator", Haptics Group, GRASP Laboratory, University of Pennsylvania, In proceeding of: EuroHaptics conference, 2009 and Symposium on Haptic Interfaces for Virtual Environment and Teleoperator Systems, World Haptics 2009, DOI:10.1109/WHC.2009.4810909.

Saxena, et al., "Vibrate-to-Unlock: Mobile Phone Assisted User Authentication to Multiple Personal RFID Tags", 2011 IEEE International Conference on Pervasive Computing and Communications (PerCom), Seattle (Mar. 21-25, 2011), © IEEE 2011.

Tuck, Kimberly, "The MMA745xL Digital Accelerometer", Freescale Semiconductor, AN3468, Application Note, Rev. 1, May 2009, © Freescale Semiconductor, Inc., 2008-2009.

Upadhyay, et al., "Vibration Signature Analysis of High-Speed Unbalanced Rotors Supported by Rolling-Element Bearings due to Off-Sized Rolling Elements", Mechanical & Industrial Engineering Department, Indian Institute of Technology, Roorkee, India, accepted Jun. 11, 2009, International Journal of Acoustics and Vibration, vol. 14, No. 3, 2009, (pp. 163-171).

"I2C Master and Slave Operation", EFM® 32, AN0011—Application Note, Energy® Micro, Nov. 12, 2012.

"Xtrinsic MMA8451Q 3-Axis, 14-bit/8-bit Digital Accelerometer", Freescale Semiconductor, Document No. MMA8451Q, Data Sheet: Technical Data, Rev. 8, Feb. 2013, © 2010-2013 Freescale Semiconductor, Inc.

* cited by examiner

METHOD AND SYSTEM USING VIBRATION SIGNATURES FOR PAIRING MASTER AND SLAVE COMPUTING DEVICES

FIELD OF THE INVENTION

The present invention relates generally to pairing two computing devices, and more particularly to a method and a system of using vibration signatures for pairing two computing devices.

BACKGROUND

In pairing two computing devices, such as pairing screens of two tablets, a general method may take multiple steps and minutes to set up through human-software interactions. It may need to open "settings", set a "pairing mode" on a first device, set a "pairing mode" on a second device, set a first device as a mater device and a second device as a slave device, and put the two devices side-by-side. All of these steps are manually done.

SUMMARY

Embodiments of the present invention provide a method of using vibration signatures for pairing two devices. The method comprises following steps: providing an apparatus that has a master side and a slave side that has at least one frictional structure; inserting a first device into the master side; generating a pattern of vibration while inserting a second device through the slave side; detecting the pattern of vibration by a vibration detecting device of the first device and by a vibration detecting device of the second device; validating a master vibration signature by a first program on the first device and a slave vibration signature by a second program on the second device; configuring the first device as a master device by the first program and configuring the second device as a slave device by the second program. The master device and the slave device are automatically paired.

Embodiments of the present invention provide a system of using vibration signatures for pairing two devices. The system comprises an apparatus that comprises a master side and a slave side. The slave side has at least one frictional structure. The system further comprises a first device and a second device. The first device is inserted into the master side of the apparatus. The second device and the slave side generate a pattern of vibration when the second device is inserted through the slave side of the apparatus. The first device comprises a first vibration detecting device and the second device comprises a second vibration detecting device, for detecting the pattern of vibration. The first device further comprises a first program for validating a master vibration signature and configuring the first device as a master device. The second device further comprises a second program for validating a slave vibration signature and configuring the second device as a slave device.

DETAILED DESCRIPTION

Figure 1:
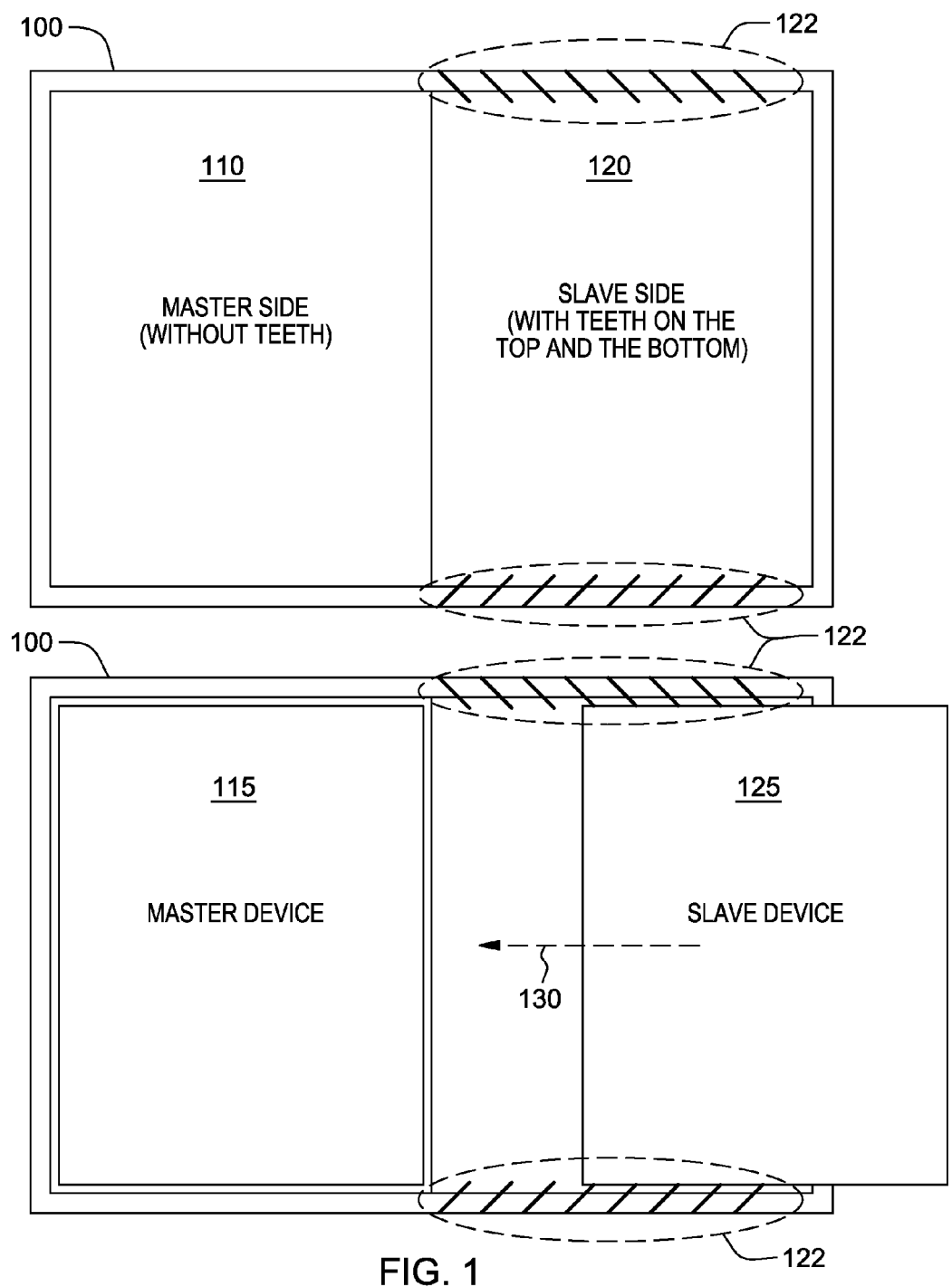
FIG. 1 shows diagrams illustrating a first exemplary apparatus of using vibration signatures for pairing master and slave devices, in accordance with an embodiment of the present invention.

FIG. 1 shows diagrams illustrating a first exemplary apparatus, apparatus 100, which is used for pairing master device 115 and slave device 125, in accordance with an embodiment of the present invention. In the embodiment, master device 115 and slave device 125 are portable computing devices such as tablets. Apparatus 100 comprises two sides: master side 110 and slave side 120. Slave side 120 has teeth 122 so as to generate a certain vibration pattern when slave device 125 is slid into slave side 120. In FIG. 1, dashed arrow line 130 shows the motion of sliding slave device 125 through slave side 120. However, master side 110 is without teeth.

Figure 2:
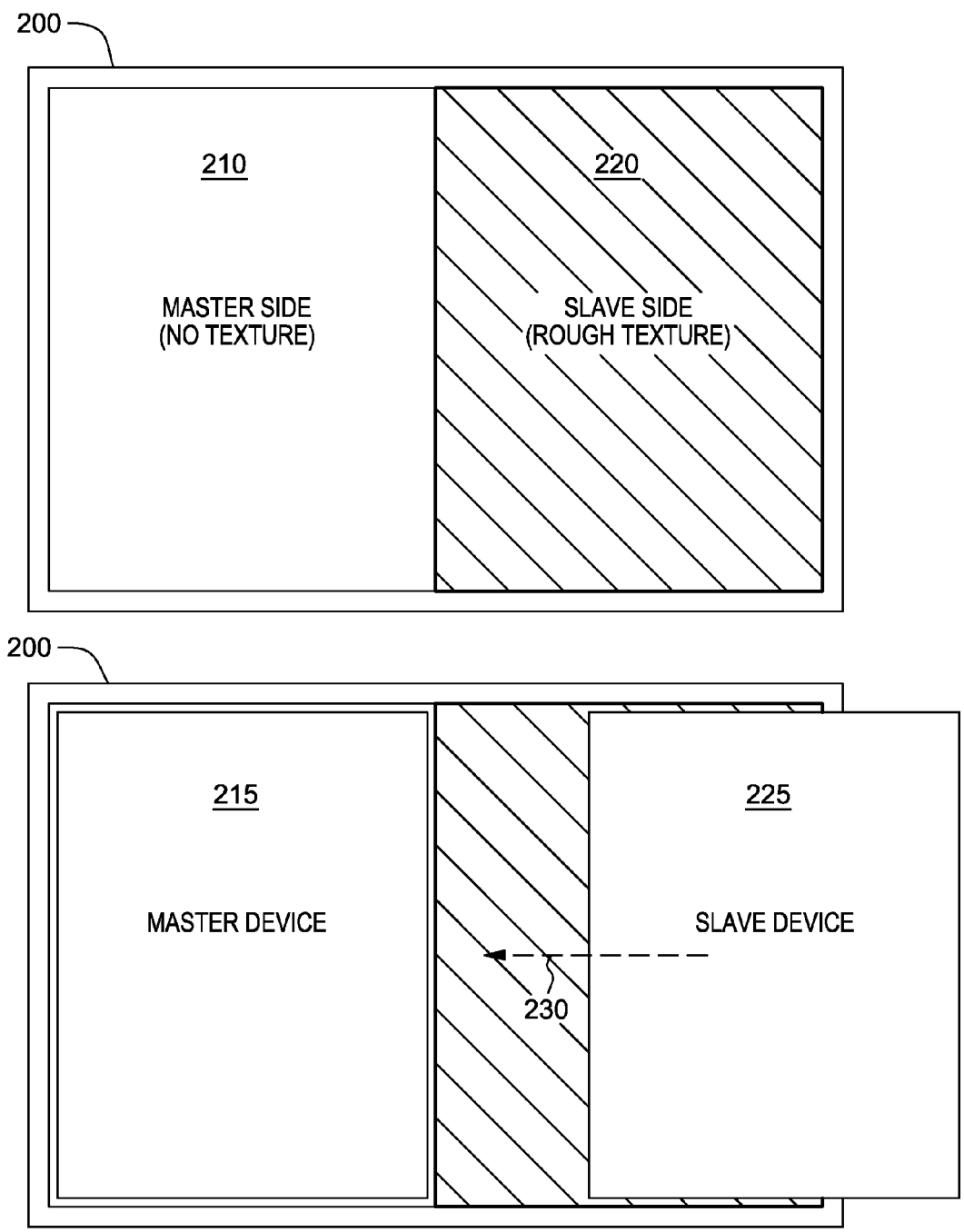
FIG. 2 shows diagrams illustrating a second exemplary apparatus of using vibration signatures for pairing master and slave devices, in accordance with an exemplary embodiment of the present invention.

FIG. 2 shows diagrams illustrating a second exemplary apparatus, apparatus 200, which is used for pairing master device 215 and slave device 225, in accordance with an embodiment of the present invention. In the embodiment, master device 215 and slave device 225 are portable computing devices such as tablets. Apparatus 200 comprises two sides: master side 210 and slave side 220. Slave side 220 has a surface with a rough texture. In FIG. 2, dashed arrow line 230 shows the motion of sliding slave device 225 into slave side 220. When slave device 225 is slid through slave side 220, a certain vibration pattern is generated due to the friction between the rough texture on slave side 220 and slave device 225. Master side 210 has no rough texture.

Figure 3:
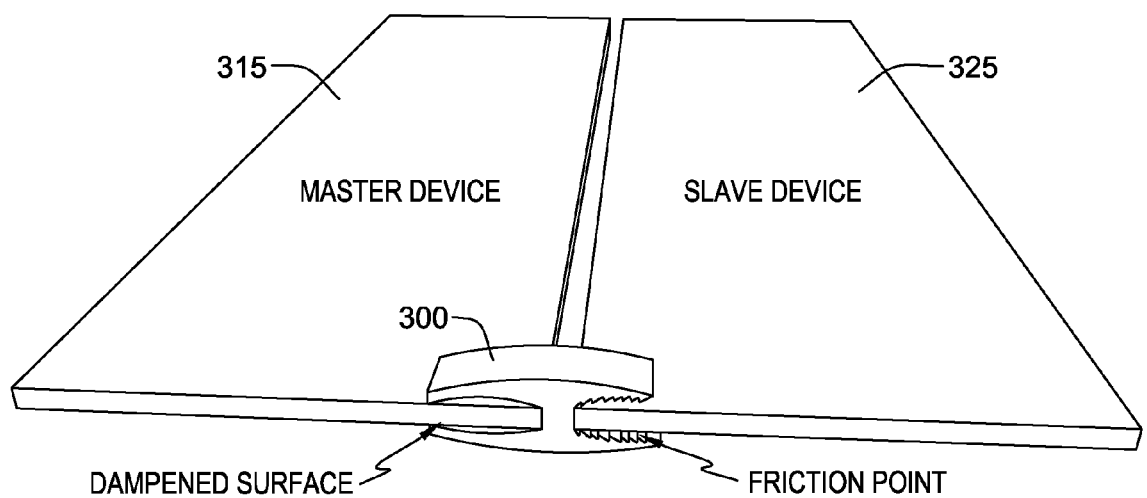
FIG. 3 shows diagrams illustrating a third exemplary apparatus of using vibration signatures for pairing master and slave devices, in accordance with an exemplary embodiment of the present invention.
Figure 3:
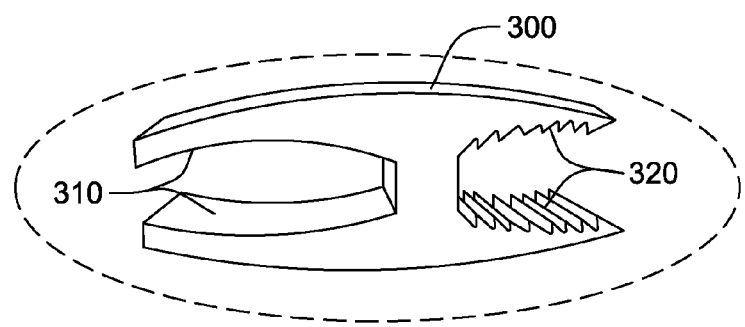

FIG. 3 shows diagrams illustrating a third exemplary apparatus, apparatus 300, which is used for pairing master device 315 and slave device 325, in accordance with an embodiment of the present invention. In the embodiment, master device 315 and slave device 325 are portable computing devices such as tablets. Apparatus 300 is a connector for master device 315 and slave device 325. Master device 315 is inserted into a master side which has dampened surfaces 310. Slave device 325 is inserted into a slave side which has surfaces with friction points 320. When slave device 325 is inserted through the slave side, a certain vibration pattern is generated due to the friction between surfaces with friction points 320 and slave device 325.

Figure 4:
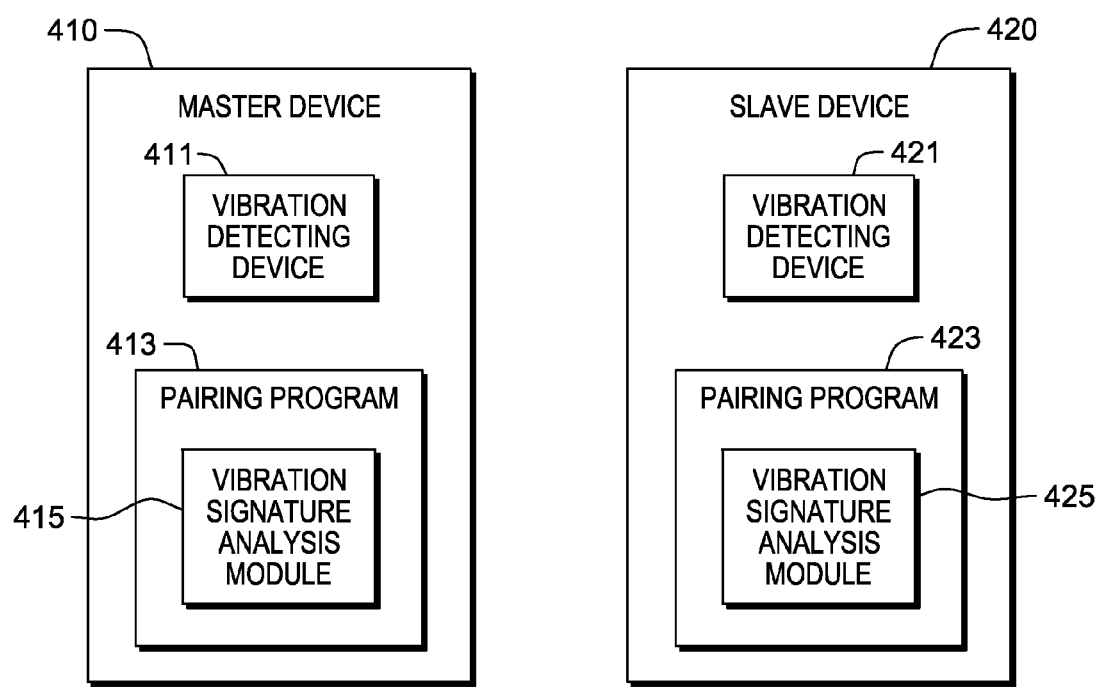
FIG. 4 shows diagrams illustrating a master device and a slave device, in accordance with an exemplary embodiment of the present invention.

FIG. 4 shows diagrams illustrating master device 410 and slave device 420, in accordance with an exemplary embodiment of the present invention. In the exemplary embodiment, master device 410 and slave device 420 are portable computing devices such as tablets. Master device 410 comprises vibration detecting device 411 and slave device 420 comprises vibration detecting device 421. In the exemplary embodiment, vibration detecting device 411 or vibration detecting device 421 is an accelerometer. The sampling rate of the accelerometer is around 50-100 samples per second (or Hertz). At this sampling rate, when a slave device (such as slave device 125 shown in FIG. 1) is slid in a slave side (such as slave side 120 shown in FIG. 1) of an apparatus (such as 100 shown in FIG. 1) within 0.25-2 seconds, the accelerometer gets 20-150 samples to compare. The quantity of the samples is more than enough for a distinguishable vibration signature. Vibration detecting device 421 on slave device 420 detects directly a pattern of the vibration due to the friction between the slave device and the apparatus. Vibration detecting device 411 on master device 410 detects the same pattern of the vibration, but the amplitude of the vibration detected by vibration detecting device 411 is a fraction of the amplitude detected by vibration detecting device 421. In another embodiment, the vibration can be detected by a microphone. The audio sampling rate is generally above 44,000 samples per second (or Hertz); therefore, the microphone can distinguish a vibration signature. With higher audio sampling rate, the choice of materials and shapes of apparatus 100, 200, and 300 (shown in FIGS. 1, 2, and 3, respectively) can be more flexible.

Referring to FIG. 4, master device 410 further comprises pairing program 413. Vibration signature analysis module 415 is included in pairing program 413. In another embodiment, vibration signature analysis module 415 may be a stand-alone program separated from pairing program 413. Slave device 420 further comprises pairing program 423. Vibration signature analysis module 425 is included in pairing program 423. In another embodiment, vibration signature analysis module 425 may be a stand-alone program separated from pairing program 423.

Vibration signature analysis module 415 on master device 410 validates a master vibration signature, in response to receiving the pattern of vibration with relatively lower amplitude detected by vibration detecting device 411. In response to that the master vibration signature is validated by vibration signature analysis module 415, pairing program 413 configures master device 410 as a master device. Vibration signature analysis module 425 on slave device 420 validates a slave vibration signature, in response to receiving the pattern of vibration with relatively higher amplitude detected by vibration detecting device 421. In response to that the slave vibration signature is validated by vibration signature analysis module 425, pairing program 423 configures slave device 420 as a slave device. Finally, master device 410 and slave device 420 are paired by pairing programs 413 and 423. For example, when two tablets are paired for screen extending, a screen extending program functions as pairing program 413 or 423.

Figure 5:
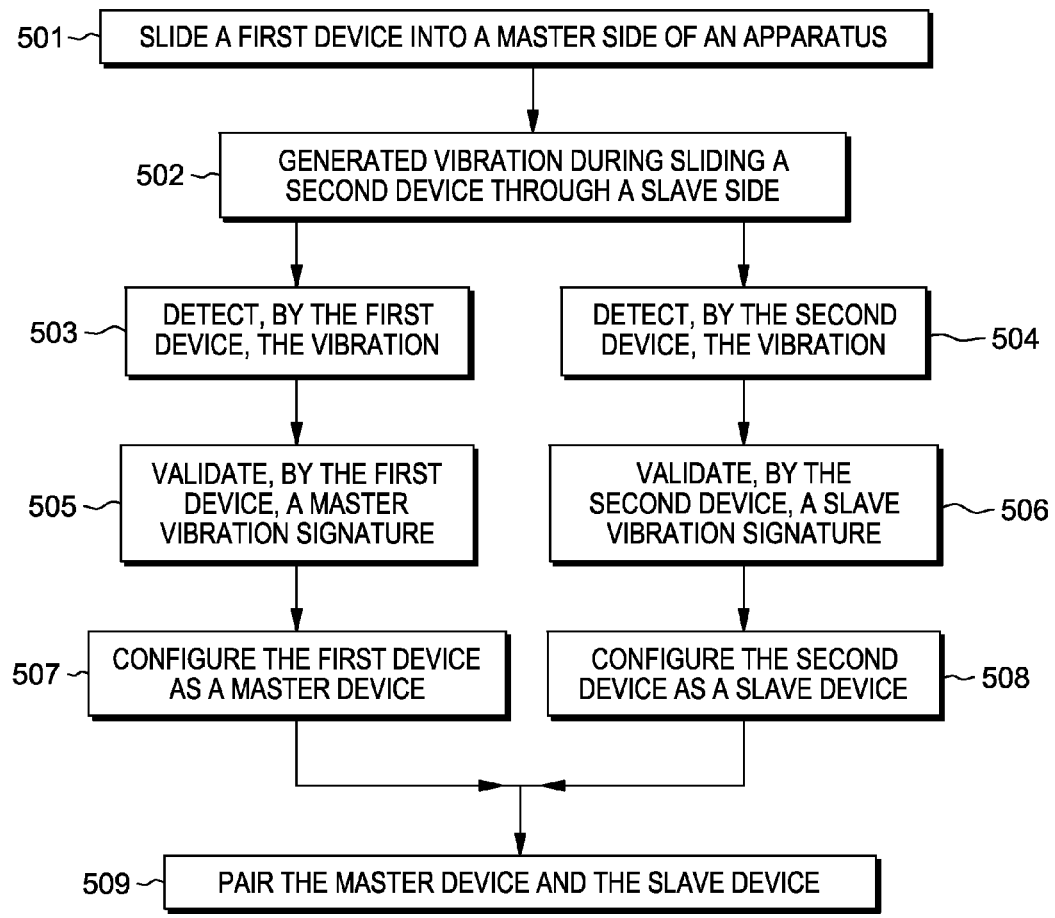
FIG. 5 is a flowchart illustrating a method of using vibration signatures for pairing two devices, in accordance with an exemplary embodiment of the present invention.

FIG. 5 is a flowchart illustrating a method of using vibration signatures for pairing two devices, in accordance with an exemplary embodiment of the present invention. In the method, an apparatus for pairing two devices is used. The apparatus has a master side and a slave side. The examples of apparatus are apparatus 100 shown in FIG. 1, apparatus 200 shown in FIG. 2, and apparatus 300 shown in FIG. 3.

Step 501 of the method is to slide a first device into the master side of the apparatus. In the exemplary embodiment, the first device is a portable computing device such as a tablet. The master side does not have teeth 122 shown in FIG. 1, the rough texture shown in FIG. 2, or friction points 320 shown in FIG. 3. For example, master device 115 is slid into master side 110 of apparatus 100 (shown in FIG. 1), master device 215 is slid into master side 210 of apparatus 200 (shown in FIG. 2), or master device 315 is slid into master side 310 of apparatus 300 (shown in FIG. 3).

Step 502 of the method is to generate a certain pattern of vibration during sliding a second device through the slave side of the apparatus. In the exemplary embodiment, the second device is a portable computing device such as a tablet. The slave side has teeth 122 shown in FIG. 1, the rough texture shown in FIG. 2, or friction points 320 shown in FIG. 3. In the first example, when slave device 125 is slid through slave side 120 of apparatus 100 and moves against teeth 122 on slave side 120 (as shown in FIG. 1), a certain pattern of vibration is generated. In the second example, when slave device 225 is slid through slave side 220 of apparatus 200 and moves against rough texture on slave side 120 (as shown in FIG. 2), a certain pattern of vibration is generated. In the third example, when slave device 325 is slid through apparatus 300 and moves against friction points 320 (as shown in FIG. 3), a certain pattern of vibration is generated.

At step 503, the first device detects the pattern of the vibration. Substantially at the same time, at step 504, the second device detects the pattern of the vibration. The first and the second devices detect the pattern of the vibration with vibration detecting device 411 and vibration detecting device 421 (shown in FIG. 4), respectively. Vibration detecting device 411 or vibration detecting device 421 is an accelerometer. In another embodiment, vibration detecting device 411 or vibration detecting device 421 is a microphone. Both vibration detecting device 411 and vibration detecting device 421 detect the same pattern of the vibration. The first device receives relatively lower amplitude of the vibration; however, because the friction between the second device the apparatus is directly detected by the second device, the second device receives relatively higher amplitude of the vibration.

At step 505, the first device validates a master vibration signature. In the exemplary embodiment, step 505 is implemented by vibration signature analysis module 415 in pairing program 413 (shown in FIG. 4). Substantially at the same time, at step 506, the second device validates a slave vibration signature. In the exemplary embodiment, step 506 is implemented by vibration signature analysis module 425 in pairing program 423 (shown in FIG. 4). The relatively lower amplitude of the vibration is used as the master vibration signature, and the relatively higher amplitude of the vibration is used as the slave vibration signature.

At step 507, a pairing program (such as pairing program 413 shown in FIG. 4) on the first device configures the first device as a master device. Substantially at the same time, at step 508, a pairing program (such as pairing program 423 shown in FIG. 4) on the second device configures the second device as a slave device.

At step 509, the pairing programs on the first device and the second program (such as pairing program 413 and pairing program 423) pairs the first device as the master device and the second device as the slave device. For example, the pairing programs are screen extending programs and screens of two tablets are paired.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of using vibration signatures for pairing two devices, comprising the steps of:
    providing an apparatus having a master side and a slave side, the slave side having at least one frictional structure to generate a pattern of vibration;
    inserting a first device into the master side;
    generating the pattern of vibration while inserting a second device through the slave side;
    detecting, by a vibration detecting device of the first device and by a vibration detecting device of the second device, the pattern of vibration;
    validating a master vibration signature by a first program on the first device and a slave vibration signature by a second program on the second device;
    configuring the first device as a master device by the first program and the second device as a slave device by the second program; and
    wherein the master device and the slave device are automatically paired.

2. The method of claim 1, wherein the at least one frictional structure is rough texture.

3. The method of claim 1, wherein the at least one frictional structure is a structure of teeth.

4. The method of claim 1, wherein the at least one frictional structure is a structure of friction points.

5. The method of claim 1, wherein the vibration detecting device of the first device or the vibration detecting device of the second device is an accelerometer.

6. The method of claim 1, wherein the vibration detecting device of the first device or the vibration detecting device of the second device is a microphone.

7. The method of claim 1, wherein the first device detects a lower amplitude of the pattern of vibration and the second device detects a higher amplitude of the pattern of vibration.

8. The method of claim 1, wherein the master vibration signature is a lower amplitude of the pattern of vibration and the slave vibration signature is a higher amplitude of the pattern of vibration.

9. The method of claim 1, wherein the first device or the second device is a tablet.

10. A system of using vibration signatures for pairing two devices, comprising:
- an apparatus comprising a master side and a slave side, the slave side having at least one frictional structure to generate a pattern of vibration;
- a first device, the first device being inserted into the master side;
- a second device, the second device and the slave side generating the pattern of vibration while the second device is being inserted through the slave side;
- the first device comprising a first vibration detecting device, the first vibration detecting device detecting the pattern of vibration;
- the second device comprising a second vibration detecting device, the second vibration detecting device detecting the pattern of vibration;
- the first device comprising a first program for validating a master vibration signature and configuring the first device as a master device; and
- the second device comprising a second program for validating a slave vibration signature and configuring the second device as a slave device.

11. The system of claim 10, wherein the at least one frictional structure is rough texture.

12. The system of claim 10, wherein the at least one frictional structure is a structure of teeth.

13. The system of claim 10, wherein the at least one frictional structure is a structure of friction points.

14. The system of claim 10, wherein the first vibration detecting device or the second vibration detecting device is an accelerometer.

15. The system of claim 10, wherein the first vibration detecting device or the second vibration detecting device is a microphone.

16. The system of claim 10, wherein the first device detects a lower amplitude of the pattern of vibration and the second device detects a higher amplitude of the pattern of vibration.

17. The system of claim 10, wherein the master vibration signature is a lower amplitude of the pattern of vibration and the slave vibration signature is a higher amplitude of the pattern of vibration.

18. The system of claim 10, wherein the first device or the second device is a tablet.

* * * * *